Patented Jan. 22, 1929.

1,699,823

UNITED STATES PATENT OFFICE.

FRITZ ULLMANN, OF CHARLOTTENBURG, AND GERT TREWENDT, OF BERLIN, GERMANY, ASSIGNORS TO J. MICHAEL & CO., OF BERLIN, GERMANY.

PROCESS FOR THE MANUFACTURE OF ARSENIC ACID.

No Drawing. Application filed February 26, 1924, Serial No. 695,340, and in Germany March 6, 1923.

This invention relates to the manufacture of arsenic acid from arsenic trioxide and/or arsenic by means of an acid catalytic of extremely low cost.

Arsenic acid has heretofore been made by an oxidation process with nitric acid.

Arsenic acid has also heretofore been made from a mixture of arsenic, chlorate of sodium and water, a solution of tetraoxide of osmium being added as a catalyzer.

The nitric acid process requires extensive and costly plant installation because of the necessity for regeneration of the nascent nitric gases, and has the disadvantage that this process involves loss of nitrogen as well as loss of arsenic through the formation of insoluble arsenical slush residues.

The catalytic method by the use of tetraoxide of osmium has not the disadvantages of the nitric acid process but because of the extremely high cost of the catalyzing agent, has not and probably never will come into extensive commercial use.

The object of our invention is to use the catalytic method but with a catalytic agent of such low cost as to permit of the production of arsenic acid by such method commercially, in which there remains no residue, no loss of arsenical material, and no poisonous fumes produced during oxidation.

By experiment and research, we have discovered that certain acids may be used as catalytics in the production of arsenic acid, among them being hydrochloric acid and vanadic acid, and thus all the advantages of the catalytic method are obtained at a cost considerably less than the nitric acid method, without the large expenditure for plant and equipment which the latter process requires, and with the ability to employ a catalytic much below the cost of the expensive catalytic tetraoxide of osmium.

A process comprising the use of hydrochloric acid is claimed in applicants' co-pending application now Patent No. 1,677,257, of July 17, 1928.

There are a variety of ways in which our invention can be used, and within reasonable limits the quantities of the chemicals used may be varied and some substitutions may be made, as, for instance, the substitution of arsenic (As) for trioxide of arsenic ($As_2O_3$), without departing from the principle involved in our process.

We have discovered that trioxide of arsenic ($As_2O_3$) and arsenic (As), that is, a substance containing arsenic in the lower state of oxidation, can be readily, easily and quantitatively transformed into arsenic acid, if slight quantities of non-nitrogenous acids or non-nitrogenous salts, such as hydrochloric acid, or vanadic acid, or vanadic salts, copper salts or the like, are added as a catalytic agent.

For the purpose of illustration, we give below an example of the production of arsenic acid by our method, but we wish it distinctly understood that this example is for the purpose of illustration only and is not to be treated as a limitation of our invention. Said example is as follows:

A mixture of 10 parts of trioxide of arsenic ($As_2O_3$), 20 parts of water ($H_2O$), and 3.8 parts of chlorate of sodium ($NaClO_3$) is heated to boiling temperature and then 0.7 parts of hydrochloric acid (HCl) in a solution of 1.1 specific gravity is slowly added to the mixture. With the violent reaction the trioxide of arsenic will soon dissolve and a solution of arsenic acid is obtained.

The solution of arsenic acid obtained by this process is particularly adapted for use in the production of arsenate of calcium, an insecticide of particular value in controlling the boll weevil and other crop parasites.

We wish it distinctly understood that our invention can be practiced by changing the chemical formula above indicated, by using other chlorates, as, for instance, a chlorate of potassium ($KClO_3$) in place of chlorate of sodium ($NaClO_3$), but that such change is only for the purpose of further illustration and not as defining the limits or scope of our invention.

We also wish it distinctly understood that in the example given, somewhat equivalent results will be obtained if substantially the same number of parts are taken of the equivalent substance, that is, 10 parts of a substance containing a form of arsenic in the lower state of oxidation; 3.8 parts of the equivalent chlorate above noted; 0.7 parts of a non-nitrogenous acid having a specific gravity of 1.1.

In the claims though I claim acids as my preferred catalytic agents, I consider for certain purposes vanadic salts, copper salts or the like as equivalents.

Having described our invention, what we claim and desire to secure by Letters Patent is:

1. The process of making arsenic acid which consists in heating to boiling a solution comprising 10 parts of arsenic trioxide, 20 parts of water and 3.8 parts of potassium chlorate, and then adding thereto a small amount of acid.

2. The process of making arsenic acid which consists in heating to boiling a solution comprising approximately twice as much water as arsenic of a lower valence and approximately one-fifth as much of potassium chlorate as water, and then adding thereto a small amount of acid.

3. The process of making arsenic acid which consists in heating to boiling a solution comprising approximately 10 parts of arsenic trioxide and 4 parts of an oxidizing agent, and adding thereto a small amount of acid.

This specification signed this 15th day of January, 1924.

FRITZ ULLMANN.
GERT TREWENDT.